Nov. 15, 1927.
N. J. PEPIN
1,649,728
CLUTCH MECHANISM
Filed Nov. 23, 1926      3 Sheets-Sheet 1
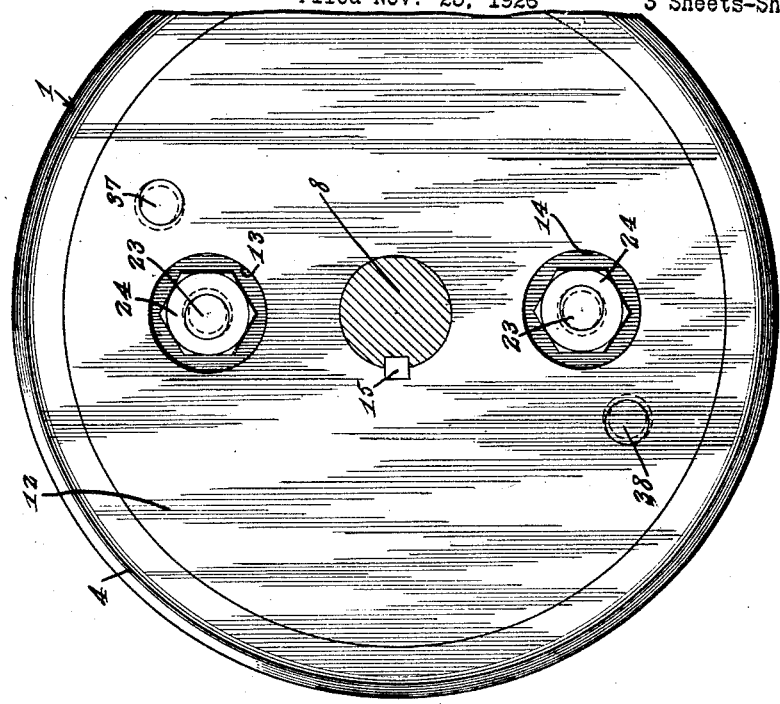
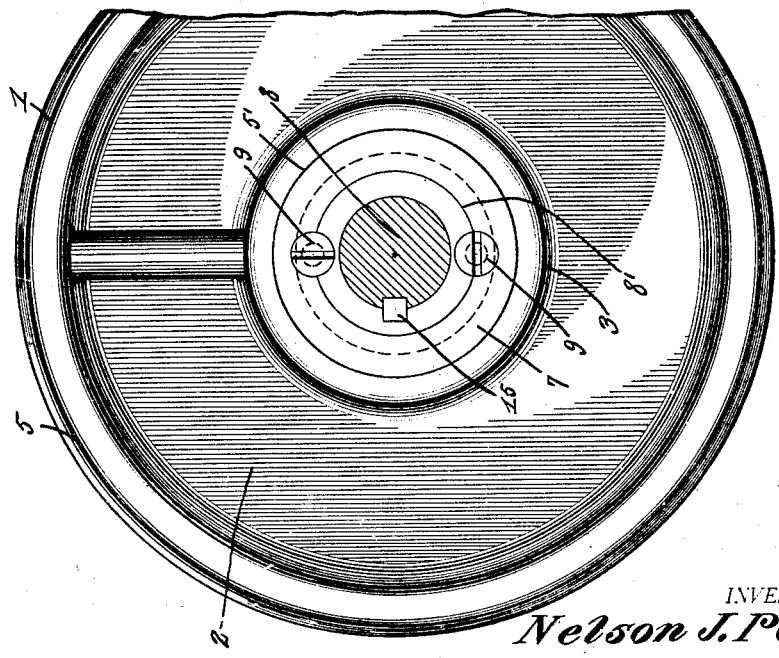
INVENTOR.
Nelson J. Pepin,
BY
Geo. P. Kimmel.   ATTORNEY.

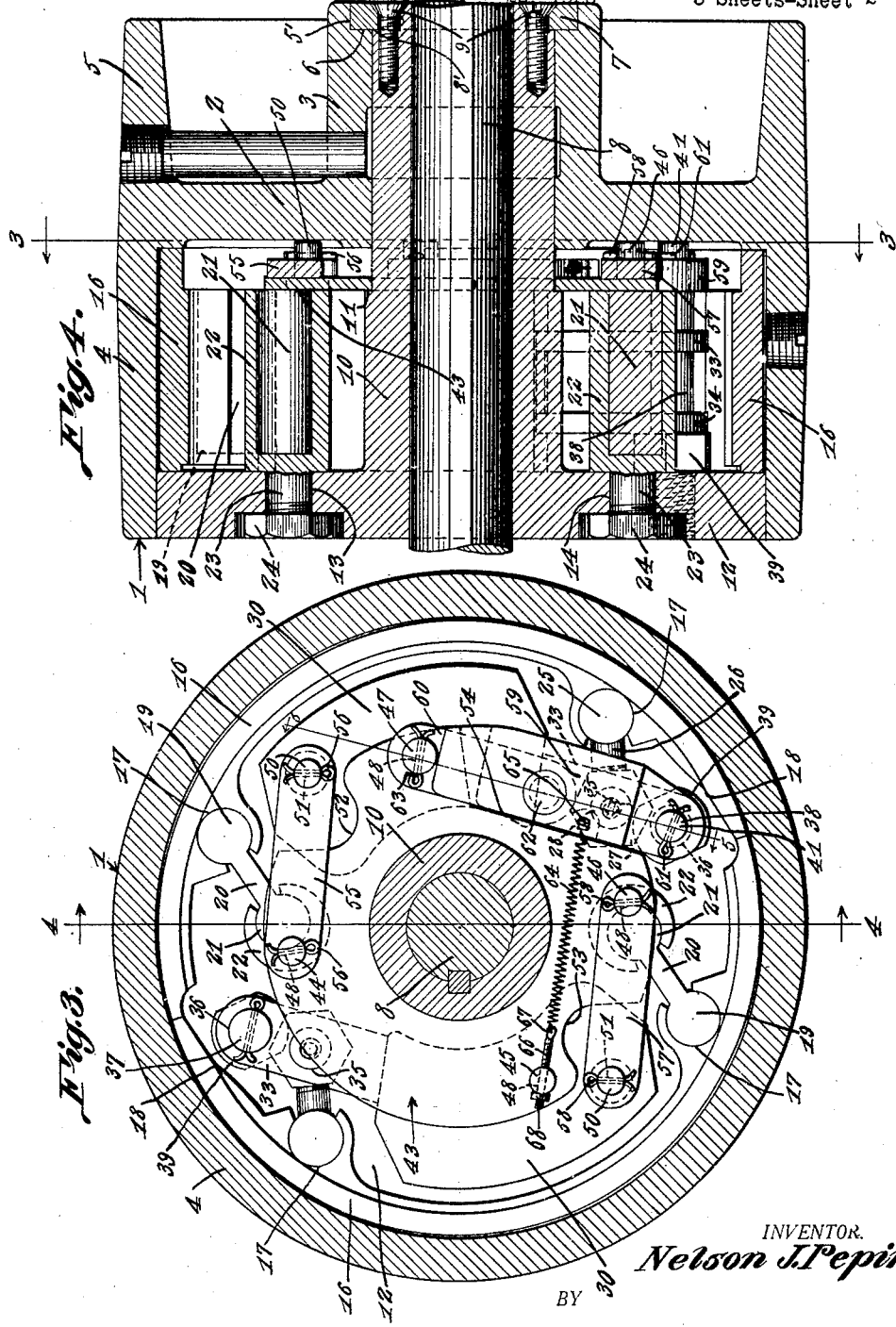

Nov. 15, 1927.
N. J. PEPIN
1,649,728
CLUTCH MECHANISM
Filed Nov. 23, 1926     3 Sheets-Sheet 3
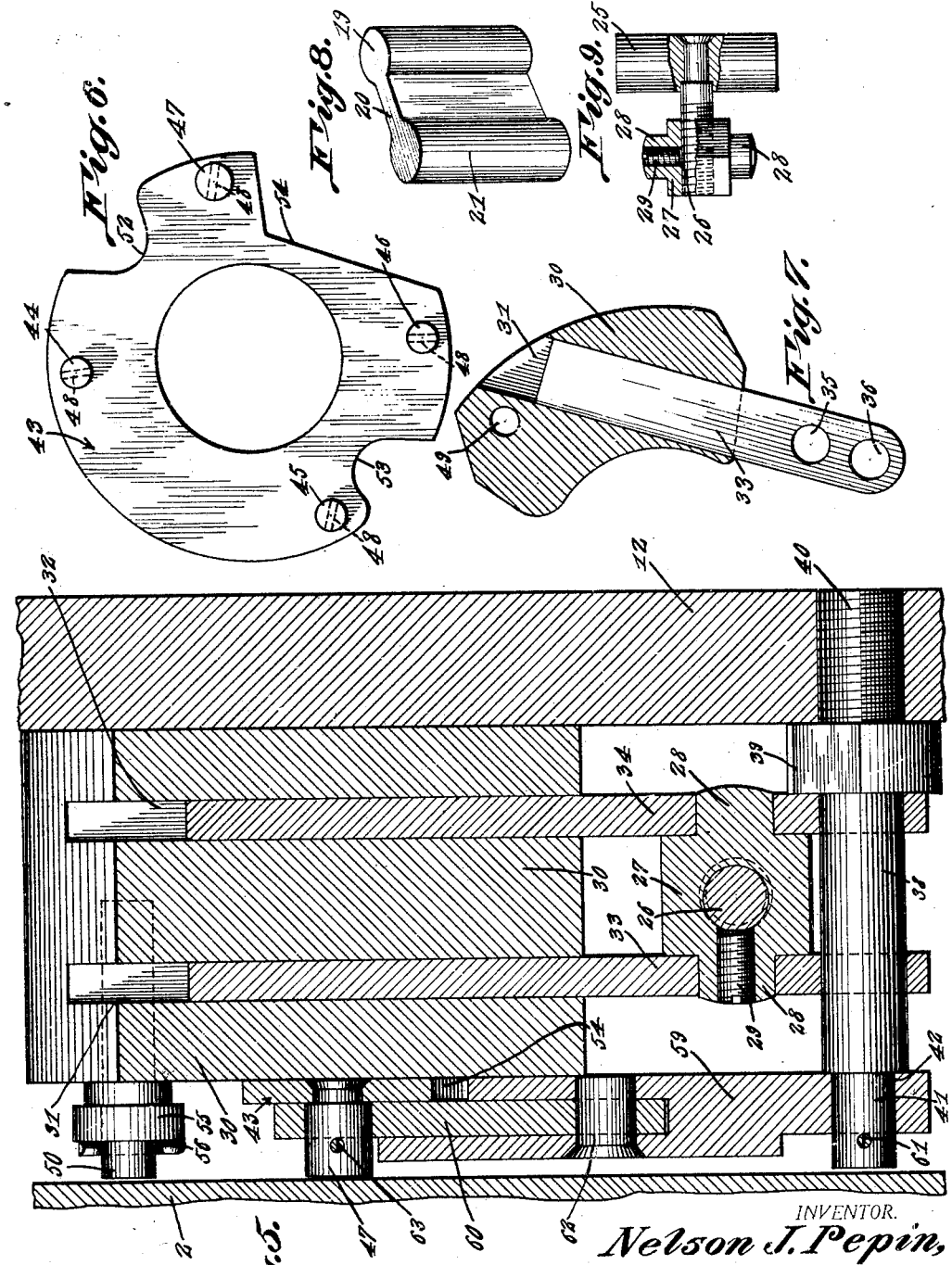
INVENTOR.
*Nelson J. Pepin,*
BY
*Geo. F. Kimmel.*    ATTORNEY.

Patented Nov. 15, 1927.

1,649,728

UNITED STATES PATENT OFFICE.

NELSON J. PEPIN, OF LOWELL, MASSACHUSETTS.

CLUTCH MECHANISM.

Application filed November 23, 1926. Serial No. 150,259.

This invention relates to a clutch mechanism, of the centrifugal type for use in connection with power transmitting pulleys or the like, and is designed primarily as an improvement upon Letters Patent 1,587,410 granted to me November 21, 1925, and it not only embodies the objects and advantages of the Letters Patent aforesaid, but has for its further object to provide, in a manner as hereinafter set forth, a clutching mechanism of the type referred to constructed and arranged whereby the drive will revolve the clutching mechanism for a period before the power transmitting pulley is clutched to operate the latter, that is to say to allow the power to gain some speed before it is called upon to start the load, under such conditions eliminating the starting torque or reducing the same to a minimum with respect to the power pulley.

A further object of the invention is to provide, in a manner as hereinafter set forth, a centrifugal clutching mechanism, including a plurality of clutching elements operated by centrifugal force and a controlling means for said elements for keeping them balanced relatively to each other at all speeds, and further for controlling the clutching elements to provide for their activity at a certain predetermined speed.

Further objects of the invention are to provide, in a manner as hereinafter set forth, a clutching mechanism of the centrifugal type, which is comparatively simple in its construction and arrangement, strong, durable, compact, thoroughly efficient in its use, conveniently installed with respect to a power pulley, readily assembled and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a fragmentary view, looking towards one side of a power pulley, having connected therewith a clutching mechanism in accordance with this invention.

Figure 2 is a fragmentary view, looking towards the other side of a power pulley having associated therewith a clutching mechanism in accordance with this invention.

Figure 3 is a section on line 3—3 Figure 4.

Figure 4 is a section on line 4—4 Figure 3.

Figure 5 is a view upon an enlarged scale taken on line 5—5 Figure 3 illustrating the elements in section.

Figure 6 is an elevation of the controller ring.

Figure 7 is a detail in section illustrating one of the weights.

Figure 8 is a perspective view of one of the prop links.

Figure 9 is a sectional elevation of a pivot pin.

Referring to the drawings in detail 1 denotes the rim, 2 the web and 3 the hub of a power pulley. The web 2 is formed integral with the inner face of the rim 1 at one side of the axial center of the pulley. The hub 3 extends from only one side of the web 2 and projects slightly beyond one dge of the rim 1. The web 2 divides the rim 1 into what may be termed a wide portion 4 and a narrow portion 5 and the hub 3 is surrounded by the narrow portion 5 and projects slightly from the outer edge thereof. The shiftable elements of the clutching mechanism, to be presently referred to, which act to clutch the pulley with the power shaft are arranged within the wider portion 4 of the rim 1. The inner face of the hub 3 at the outer end thereof is rabbeted as at 5′ thereby forming the inner face of the hub 3 with an annular shoulder 6. Seated in the rabbet 5 and abutting against the shoulder 6 is a retaining ring 7 for the pulley, and which acts as a means to retain or maintain the pulley upon the tubular shaft of the clutching mechanism to be presently referred to. Such tubular shaft is carried by the power shaft 8 and is formed with a rabbet 8′ at its outer end upon which is mounted the ring 7. Countersunk hold fast devices 9 are employed for securing the ring 7 in position.

The clutching mechanism includes the said tubular shaft which is designated 10, formed intermediate its ends with a peripheral shoulder 11 and at that end opposite the end to which the ring 7 is secured, is provided with an annular flange 12 which is termed a live flange. The flange 12 is surrounded by the wider portion 4 of the rim 1. The flange 12 is of appropriate thickness and is flush with the outer edge of the wider portion 4 of the rim of the pulley, as shown in Figure 4. The flange 12 is formed with a pair of diametrically disposed countersunk openings 13, 14. The tubular shaft 10, is keyed to the drive shaft 8, as at 15 and is bodily carried with the latter.

The power pulley is loosely mounted on the tubular shaft 10, but is coupled therewith by the clutching devices of the clutching mechanism whereby the power pulley clutching mechanism and shaft 8 will move in unison, but the clutching mechanism is revolved for a period before it acts to clutch the power pulley whereby the starting torque of the power pulley is eliminated or reduced to a minimum.

The clutching mechanism includes a pair of opositely disposed clutching devices which are moved to active position, that is to say, to clutch the inner face of the wider part 4 of rim 1 by centrifugal force and as the construction of both of said clutching devices is the same, but one will be described as the description of one will apply to the other.

Each clutching device consists of a semicircular section or clutching shoe 16 provided between its center and each end with a socket 17 and the said sockets 17 are spaced equi-distant from the ends of the shoe 16. The shoe in proximity to one end thereof is cut away to provide a clearance as indicated at 18. Mounted in one of the sockets 17 is the cylindrical outer end 19 of a prop link 20, and which is formed with a cylindrical inner end 21. Secured to the inner face of the flange 12 is a pair of socket forming members and which are diametrically disposed. Each member 22 is formed with a shank 23 carrying a securing nut 24 on its outer end. The shanks 23 and securing nuts are mounted in the countersunk openings 13, 14. The end 21 of a prop 20 is mounted in a socket forming member 22. The ends 19 and 21 of the prop links are shiftably mounted within their respective sockets.

Mounted in the other socket 17 of the shoe 16 is a pivot pin 25 having fixedly secured thereto, intermediate its ends, a threaded connecting bar 26, disposed at right angles with respect to the pin 25 and having threaded engagement with a coupling member 27 formed with a pair of oppositely disposed lateral extensions 28. The bar 26 is locked to the member 27 by a holding screw 29.

Associated with each coupling device is a shifting means of the weight type and which is actuated by centrifugal force whereby each of the coupling devices will be moved to frictionally engage the inner face of the rim and couple the power pulley with the drive shaft. As the shifting means for each coupling device is of the same construction but one will be described as the description of one will apply to the other. The shifting means for one coupling device is oppositely disposed with respect to the shifting means for the other coupling device. Each of the said shifting means comprises a weight 30 of segmental contour having a pair of diagonally extending passages 31, 32 which extend from the follower end of the weight and open at the outer side of the weight in proximity to the forward end thereof or rather leading end. The weight 30 is slidably mounted on a pair of arms 33, 34 which extend into the passages 31, 32 respectively and overlap a coupling member 27. Each of said arms is formed at its outer end with a pair of spaced openings 35, 36. The openings 35 of said arms aline and pivotally mounted therein are the extensions 28 of a coupling member 27. By this arrangement the coupling member 27 is pivotally connected to a pair of arms 33, 34. The member 27, extensions thereof, bar 26 and pin 25 provides a pivotal actuating connection for a shoe.

Secured to the live flange 12 at diametrically opposite points are inwardly extending posts 37, 38. Each post is formed with a polygonal shaped flange 39 spaced an appropriate distance from the outer end thereof, and that portion of the post arranged outwardly with respect to the flange 39 is peripherally threaded as indicated at 40 for engagement in the live flange 12. The flanges 39 facilitate the connecting of the posts to the flange 12. The post 38 is of greater length than the post 37 and the inner end of the former is provided with a reduced terminal portion 41, which forms a shoulder 42. The post 37 is not provided with the reduced terminal portion 41 as the post 38, otherwise than that as stated the post 37 is constructed in the same manner as the post 38. The openings 36 in each pair of arms aline and extending through the alining openings is the posts 37, 38 whereby each pair of arms is pivotally mounted on its respective post.

Associated with and connected to the pair of weights 30 is a controller ring referred to generally by the reference character 43, and which is shiftably mounted on the tubular shaft 10 and abuts against the shoulder 11. The ring 43 on that face which opposes the web 2 is provided with a series of spaced lugs 44, 45, 46 and 47. Each of said lugs is formed with an opening 48. The function of the openings 48 will be presently referred to. Each weight 30 is formed near its leading end with a socket 49 in which is fixedly secured a stud 50 which projects from its respective weight and is formed at its outer end with an opening 51. The ring 43 is cut away as at 52, 53, and 54 to provide clearances, and with the elongated edge of the clearance 54 to form a stop for the controller to be presently referred to.

Mounted on the lug 44 and one of the studs 50 is a pivoted link 55. Cotter pins 56 extend through the lug and stud for reretaining the link 55 in position and the latter shiftably couples the weight to the controller ring 43. Mounted on the lug 46 and the stud 50 carried by the other weight 30, is a link 57 and cotter pins 58 extend through the lug and stud for retaining the link 57 in position for the same purpose as the link 55.

Associated with the controller ring 43 is a controller element consisting of a bifurcated member 59 and a link 60. The member 59 is pivotally mounted on the extension 41 of the post 38 and retained on said extension by a cotter pin 61. The link 60 extends into the furcation of the member 59 and has one end pivotally mounted on a stud 62 carried by or secured to the member 59 and which intersects the furcation of the latter. The stud 62 is arranged in proximity to but spaced from the inner end of the furcation of the member 59. The link 60 extends from the member 59 and is mounted on the stud 47, that is to say has its outer end pivotally mounted on the stud 47 and which is retained upon said stud by a cotter pin 63. Associated with the member 59 is a controlling spring 64, and which has one end attached to the member 59 as at 65 and its other end attached to an adjusting screw 66, as at 67. The screw 66 extends through the opening formed in the stud 45 and carries an adjusting nut 68. The screw 66 in connection with nut 68 provides means for increasing and decreasing the tension of the spring 64 for controlling the operation of the controller. The controller operates on the principle of a jack knife.

The controller is in the form of a jack knife construction and will open one way but not the other. The spring 64 holds the controller straight until the centrifugal force overcomes the tension of the spring 64. As before set forth, the ring 43 and weights 30 are connected together by a pair of links. It will be seen that when the controller swings outwardly on pivot portion 41 of pin 38 as pivot 62 moves outwardly under centrifugal action, it allows the weights to spread away from the center to apply pressure on the clutching or friction shoes. The elongated edge of the clearance 54 is set up to provide a stop for the controller on its inward shift towards the center. and is held in such position by the controlling spring 64, whereby when the controller opens such action will provide for the shifting of the ring 43 and the latter will shift the prop links 20. When the power shaft is revolving above the predetermined speed, it overcomes the tension of the spring 64 and the controller opens due to centrifugal force. The weights are shifted outwardly or released due to a movement of the ring caused by the controller, on the opening of the latter, and which will provide for the application of the clutch or friction shoes. By this arrangement it will be observed that the application of the clutch, whereby the power pulley is connected with the drive shaft 8, is not had until after the clutching mechanism has revolved above a predetermined speed. When the weights swing outwardly, the arms upon which the weights are mounted, provide for the actuation of the coupling members 27, prop links 20 and bars 26 in a direction to cause the clutch or friction shoes to bind against the inner face of the rim of the pulley, to set up a coupling connection to provide for the driving of the pulley from the shaft 8.

The controller will hold the weights equidistant from the center to keep the clutching mechanism balanced at all speeds, and will furthermore control the weights as to what speed they shall act to set up an actuation of the clutching or friction shoes for the purpose of coupling the power pulley with the drive shaft, and therefore it is thought that the many advantages of a clutching mechanism, in accordance with this invention, can be readily understood and although the preferred embodiment of the invention is as illustrated and described, yet it is to be understood that changes in the details of construction can be had which will fall within the scope of the invention as claimed.

What I claim is:

1. A centrifugally operated clutching mechanism comprising a revoluble element, a pair of oppositely disposed frictional clutching shoes each having a shiftable connection with said element, a controller ring shiftably mounted on said element, a pair of oppositely disposed centrifugally operated weight elements pivotally supported on said revoluble element, a pivotal link connection between each weight element and said ring, and a pivotal actuating connection for and between each shoe and a weight element.

2. A centrifugally operated clutching mechanism comprising a revoluble element, a pair of oppositely disposed frictional clutching shoes each having a shiftable connection with said element, a controller ring shiftably mounted on said element, a pair of oppositely disposed centrifugally operated weight elements pivotally supported on said revoluble element, a pivotal link connection between each weight element and said ring, a pivotal actuating connection for and between each shoe and a weight element, and a controller element normally abutting said ring, pivotally connected with the latter and further pivotally mounted on the pivotal support for one of the weight elements.

3. A centrifugally operated clutching mechanism comprising a revoluble element, a pair of oppositely disposed frictional clutching shoes each having a shiftable connection with said element, a controller ring shiftably mounted on said element, a pair of oppositely disposed centrifugally operated weight elements pivotally supported on said revoluble element, a pivotal link connection between each weight element and said ring, a pivotal actuating connection for and between each shoe and a weight element, and an adjustable controller element of the jack knife type normally abutting said ring, pivotally connected to the latter and further pivotally mounted on one of the pivotal supports for a weight element.

4. A centrifugally operated clutching mechanism comprising a revoluble element, a pair of oppositely disposed frictional clutching shoes each having a shiftable connection with said element, a controller ring shiftably mounted on said element, a pair of oppositely disposed centrifugally operated weight elements pivotally supported on said revoluble element, a pivotal link connection between each weight element and said ring, a pivotal actuating connection for and between each shoe and a weight element, and a normally closed controller element of the jack knife type normally abutting said ring, pivotally connected to the latter and further pivotally mounted on the pivotal support for one of the weight elements and acting to prevent the actuation of the clutch shoes by said weights until the revoluble element operates above a predetermined speed.

5. A centrifugal clutching mechanism for frictionally clutching a power transmitting pulley with a drive shaft comprising a revoluble element carried by and synchronously operated with said shaft, a pair of oppositely disposed frictional clutching shoes for engagement with the pulley to couple the same with said shaft and each having a shiftable connection with said element, a controller ring shiftably mounted on said element, two pair of arms, each pair pivotally supported at one end on said element, a centrifugally operated weight slidably mounted on each pair of arms, a pivotal link connection between each weight and said ring, and a pivotal actuating connection between each shoe and a pair of arms.

6. A centrifugal clutching mechanism for frictionally clutching a power transmitting pulley with a drive shaft comprising a revoluble element carried by and synchronously operated with said shaft, a pair of oppositely disposed frictional clutching shoes for engagement with the pulley to couple the same with said shaft and each having a shiftable connection with said element, a controller ring shiftably mounted on said element, two pair of arms, each pair pivotally supported at one end on said element, a centrifugally operated weight slidably mounted on each pair of arms, a pivotal link connection between each weight and said ring, a pivotal actuating connection between each shoe and a pair of arms, and a normally closed controller element of the jack knife type abutting said ring, pivotally connected to the latter and further pivotally mounted on the pivotal support for one pair of said arms and moved to open position when said revoluble element operates above a predetermined speed to permit of the actuation of said weights to cause the application of said shoes.

7. A centrifugal clutching mechanism for frictionally clutching a power transmitting pulley with a drive shaft comprising a revoluble element carried by and synchronously operated with said shaft, a pair of oppositely disposed frictional clutching shoes for engagement with the pulley to couple the same with said shaft and each having a shiftable connection with said element, a controller ring shiftably mounted on said element, two pair of arms, each pair pivotally supported at one end on said element, a centrifugally operated weight slidably mounted on each pair of arms, a pivotal link connection between each weight and said ring, a pivotal actuating connection between each shoe and a pair of arms, and an adjustable controller element of the jack knife type abutting a portion of the outer edge of said ring, pivotally connected to the latter and further pivotally mounted on the pivotal support for one pair of arms and shifted to open position when the revoluble element operates above a predetermined speed thereby providing for the operation of the weights to cause the application of said shoes.

8. A centrifugal clutch mechanism for frictionally clutching a power transmitting pulley with a drive shaft comprising a revoluble element carried by and synchronously operated with said shaft, clutching shoes for frictional engagement with the pulley for coupling it with the drive shaft and each having a shiftable connection with said element, a controller ring shiftably mounted on said element, centrifugally operated weight elements pivotally supported at one end on said element and each including a slidable weight, a pivotal link connection between each weight and said ring, and a pivotal actuating connection for and between each shoe and a weight element.

9. A centrifugal clutch mechanism for frictionally clutching a power transmitting pulley with a drive shaft comprising a revoluble element carried by and synchronously operated with said shaft, clutching shoes for frictional engagement with the pulley for coupling it with the drive shaft and each having a shiftable connection with said element, a controller ring shiftably mounted on said element, centrifugally operated weight elements pivotally supported at one end on said element and each including a slidable weight, a pivotal link connection between each weight and said ring, a pivotal actuating connection for and between each shoe and a weight element, and an adjustable spring controlled controller element abutting the edge of said ring, pivotally connected to the latter and further pivotally mounted on a pivotal support for one of the weight elements, said controller element of the jack knife type, normally in closed position and shiftable to open position when the revoluble element operates above a predetermined speed thereby providing for the operation of the weight elements to cause the application of the shoes.

In testimony whereof, I hereby affix my signature hereto.

NELSON J. PEPIN.